US012165621B2

(12) United States Patent
Hong-Lange

(10) Patent No.: US 12,165,621 B2
(45) Date of Patent: Dec. 10, 2024

(54) METHOD AND APPARATUS FOR ROSIN APPLICATION

(71) Applicant: Shinja Vivienne Hong-Lange, Lomita, CA (US)

(72) Inventor: Shinja Vivienne Hong-Lange, Lomita, CA (US)

( * ) Notice: Subject to any disclaimer, the term of this patent is extended or adjusted under 35 U.S.C. 154(b) by 65 days.

(21) Appl. No.: 17/978,446

(22) Filed: Nov. 1, 2022

(65) Prior Publication Data

US 2023/0260487 A1 Aug. 17, 2023

Related U.S. Application Data

(60) Provisional application No. 63/309,725, filed on Feb. 14, 2022.

(51) Int. Cl.

| | |
|---|---|
| *A46B 5/02* | (2006.01) |
| *G10D 1/02* | (2006.01) |
| *G10D 3/16* | (2020.01) |
| *G10D 3/166* | (2020.01) |
| *G10D 3/173* | (2020.01) |
| *G10G 7/00* | (2006.01) |

(52) U.S. Cl.
CPC ................ *G10G 7/00* (2013.01); *G10D 1/02* (2013.01); *G10D 3/16* (2013.01); *G10D 3/166* (2013.01); *G10D 3/173* (2020.02)

(58) Field of Classification Search
CPC .......... G10D 3/16; G10D 3/166; G10D 3/173; G10D 1/02; G10D 7/00
USPC .............................................................. 401/8
See application file for complete search history.

(56) References Cited

U.S. PATENT DOCUMENTS

| | | | | |
|---|---|---|---|---|
| 5,002,180 A * | 3/1991 | Franz | G10D 3/16 | 401/88 |
| 6,249,277 B1 * | 6/2001 | Varveris | G06F 3/0393 | 345/157 |
| 8,747,002 B2 * | 6/2014 | Izkovitz | A45D 40/18 | 63/1.14 |
| 9,147,380 B2 * | 9/2015 | Jones | G10D 3/00 | |

* cited by examiner

*Primary Examiner* — Jennifer C Chiang
(74) *Attorney, Agent, or Firm* — Donald R. Boys; Central Coast Patent Agengy LLC

(57) ABSTRACT

An apparatus for applying rosin to a bow has a cake of bow rosin and a retainer element joined securely to the cake of bow rosin, the retainer element adapted to be gripped by a user's hand.

12 Claims, 7 Drawing Sheets

METHOD AND APPARATUS FOR ROSIN APPLICATION

CROSS-REFERENCE TO RELATED APPLICATIONS

The present invention claims priority of provisional application 63/309,725 filed Feb. 14, 2022, titled "Method and Apparatus for Bow Rosin Application". All disclosure of the parent application is incorporated at least by reference.

BACKGROUND OF THE INVENTION

1. Field of the Invention

The present invention is in the technical field of apparatus and methods for conditioning musical instruments and pertains more particularly to apparatus for applying rosin to a bow used with a stringed instrument, such as a violin.

2. Description of Related Art

Violin musicians, and musicians who play some other instruments with a bow, such as a cello, need to condition the bow in practice, and one necessary process is applying rosin to the bowstrings. The rosin in one circumstance comes in a cake form. In some instances, the rosin cake may be a volume with rectangular sides. In other instances, the rosin cake is cylindrical, much like the shape of a hockey puck, but somewhat smaller, and may be provided with, and in some instances joined to a soft flannel cloth. The rosin cake is developed from tree sap and processed to be fine grained to reduce dust. The cloth is to control the dust.

Rosin for bows is available generally in three versions, light, gold and dark. The light rosin is a harder rosin, and the dark is softer, and applies more rosin to the bow faster. A particular problem with rosin cakes is that the stuff is somewhat brittle, and if dropped on a hard surface tends to shatter, after which it is no longer useful. All musicians who use rosin on a bow have experienced this phenomenon.

The inventor has determined that what is clearly needed is a retainer element attached to the rosin cake and perhaps also to the cloth, by which a user might have better control, and avoid dropping the rosin.

BRIEF SUMMARY OF THE INVENTION

In one embodiment of the present invention an apparatus is provided with a cake of bow rosin with a retainer element joined securely to the cake of bow rosin, the retainer element adapted to be gripped by a user's hand. Also, in one embodiment the apparatus further comprises a piece of cloth disposed between the retainer element and the cake of bow rosin. Also, in one embodiment the retainer element is a ring having an inside diameter large enough for a finger of the user's hand, the cake of bow rosin joined to the ring securely at one point outside the inside diameter of the ring. In one embodiment the cake of bow rosin is in a form of a cylindrical disk, and the ring is joined to the cake of bow rosin proximate a center point on one side of the disk. And in one embodiment the retainer element is a strip of flexible material having a length sufficient to encircle a finger of the user's hand, and compatible areas of hook and loop fastener material on opposite ends of the strip, the cake of bow rosin joined to the strip at a point proximate a mid-point of the strip.

In one embodiment the retainer element is a split ring of thin and malleable metal enabling a user to open the ring to insert the finger, and to urge the ring closed around the finger, deforming the malleable metal. Also in one embodiment the retainer element is a split ring of flexible plastic enabling a user to open the ring from a default size to insert the finger, the ring returning to the default size after insertion.

In another aspect of the invention an apparatus is provided having a rosin cake assembly comprising a cylindrical cake of bow rosin molded around a disk of rigid material having a lesser diameter and a lesser thickness than the cake of bow rosin, the disk of rigid material having one face coplanar with a face of the disk of bow rosin, the disk of rigid material further having a female threaded hole through the thickness of the disk, and a retainer element having a base with a threaded post extending from the base, the threaded post engaging the female threaded hole, securely joining the retainer element and the rosin cake assembly, the retainer element adapted to be gripped by a user's hand.

In one embodiment the apparatus further comprises a piece of cloth disposed between the base of the retainer element and the disk of rigid material. Also, in one embodiment the retainer element comprises a ring having an inside diameter large enough for a finger of the user's hand, the rosin cake assembly joined to the ring securely by the threaded post engaging the female threaded hole. Also, in one embodiment the retainer element is a strip of flexible material having a length sufficient to encircle a finger of the user's hand, and compatible areas of hook and loop fastener material on opposite ends of the strip. In one embodiment the retainer element is a split ring of thin and malleable metal enabling a user to open the ring to insert the finger, and to urge the ring closed around the finger, deforming the malleable metal. And in one embodiment the retainer element is a split ring of flexible plastic enabling a user to open the ring from a default size to insert the finger, the ring returning to the default size after insertion.

In another aspect of the invention a method for applying rosin to strings of a bow is provided, comprising engaging, with a finger of one hand, a retainer element of an apparatus having a cake of bow rosin with the retainer element joined securely to the cake of bow rosin, holding the bow with an opposite hand, and rubbing the cake of bow rosin with the one hand along the length of strings of the bow. In one embodiment the method further comprises placing a piece of cloth between the retainer element and the cake of bow rosin. Also, in one embodiment the retainer element is a ring having an inside diameter large enough for a finger of the user's hand, the cake of bow rosin joined to the ring securely at one point outside the inside diameter of the ring, comprising engaging the retainer element by passing the finger through the ring. In one embodiment the retainer element is a strip of flexible material having a length sufficient to encircle a finger of the user's hand, and compatible areas of hook and loop fastener material on opposite ends of the strip, the cake of bow rosin joined to the strip at a point proximate a mid-point of the strip, comprising engaging the retainer element by wrapping the strip around the finger and engaging the areas of hook and loop fastener material.

In one embodiment of the method the retainer element is a split ring of thin and malleable metal, comprising opening the ring, inserting the finger, and urging the ring closed around the finger, deforming the malleable metal. In one embodiment the retainer element is a split ring of flexible plastic, comprising opening the ring from a default size, and inserting the finger, the ring returning to the default size after insertion. And in one embodiment the retainer element is joined to the cake of bow rosin by threading a threaded post of the retainer element into a rigid disk molded into the cake of bow rosin, comprising engaging, with a finger of one hand, the retainer element, holding the bow with an opposite hand, and rubbing the cake of bow rosin with the one hand along the length of strings of the bow.

DETAILED DESCRIPTION OF THE INVENTION

Figure 1:
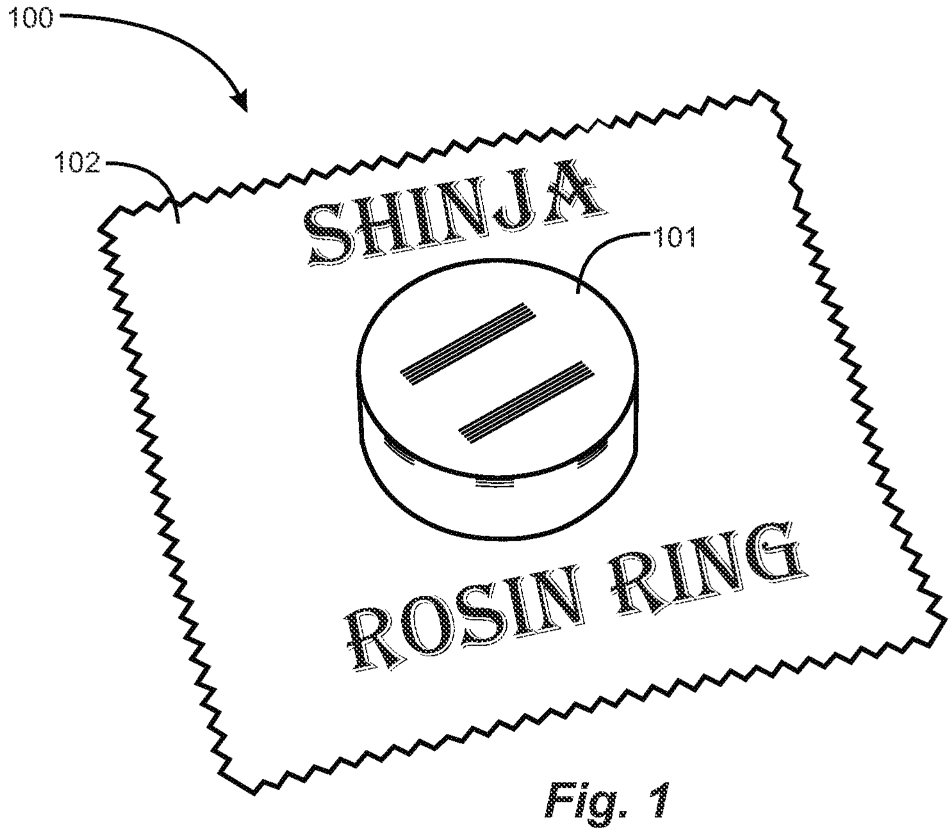
FIG. 1 is an illustration of a Rosin Ring in an embodiment of the present invention, having a cake of bow rosin.

FIG. 1 is an illustration of a Rosin Ring apparatus 100 in an embodiment of the present invention. A cake of rosin 101 is centrally attached by a suitable adhesive to a square felt cloth 102. The cloth in this example is annotated with the Inventor's name and the name of the invention, although any other annotation might be used or no annotation at all. The cloth may be of any shape or size. Not shown in FIG. 1 is a retainer element on a backside of cloth 102 by which the cloth and the rosin cake, may be securely gripped by a user.

Figure 2:
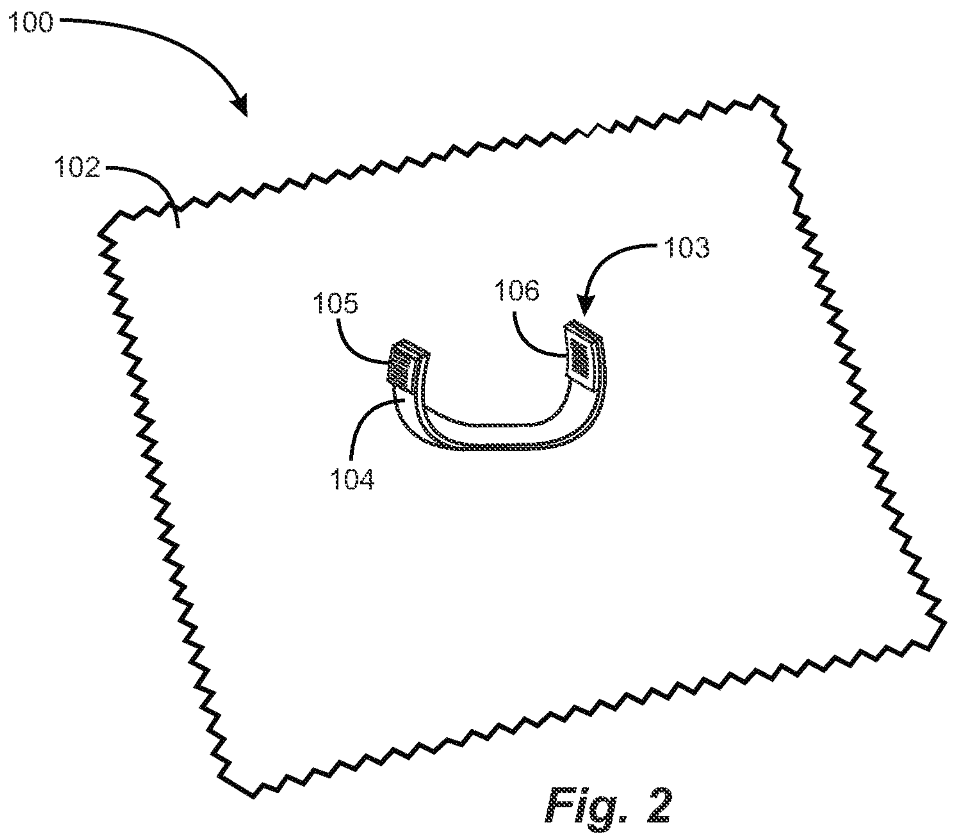
FIG. 2 is an illustration of the Rosin Ring of FIG. 1 seen from an opposite side, with a retainer element in an embodiment of the invention.

FIG. 2 is an illustration of the Rosin Ring of FIG. 1 seen from an opposite side. Strap 103 in FIG. 2, in this example, is a flexible strip 104 with Velcro™ material patches 105 and 106 joined to strip 104 by a suitable adhesive. The material of flexible strip 104 may be cloth, a synthetic fabric, leather, or another suitably thin and flexible material. The overall length is sufficient to wrap around a user's finger with the Velcro™ areas protruding enough to meet and fasten.

With the Rosin Ring lying with the cake side down and the ring side up, a user may place the back of her hand proximate the strap with one finger over the strap, and may close the strap around the one finger, the Velcro™ parts joining, such that the cloth and the rosin cake on the opposite side is held by the user's finger in the closed strap.

As described above in the Background section, the rosin is a brittle material, and dropping and breaking up the rosin cake is a frequent occurrence when applying rosin to a bow. With the rosin cake and cloth secured to the user's finger such accidental destruction of a rosin cake is eliminated. With the rosin cake and the cloth held by the user's finger, the user may rosin the bow without danger of dropping the rosin cake.

Figure 3:
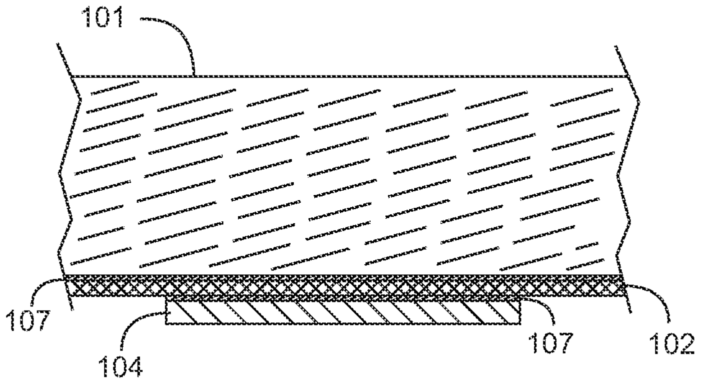
FIG. 3 is a cross section of the rosin ring of FIG. 2 taken through a strap, a cloth and the rosin cake, illustrating joining of the three separate elements of the Rosin Ring.

FIG. 3 is a cross section of assembly of the rosin cake 101, the cloth 102 and the strip 104 of strap 103, with a layer of adhesive 107 between the rosin cake and the cloth, and also between the cloth and the strap. It is preferred that the entire back surface of the rosin cake be secured by adhesive to the cloth, as the rosin surface is not a rigid surface, and the extra area may be advantageous.

Figure 4:
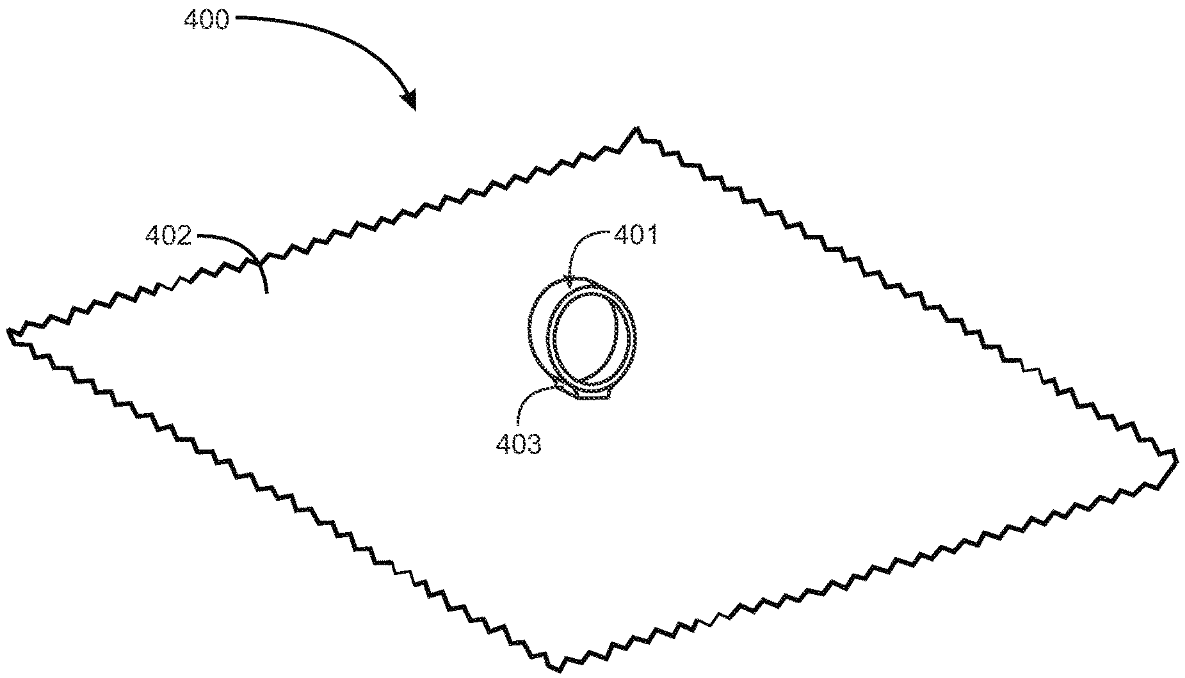
FIG. 4 is a perspective view of a Rosin Ring with an alternative retainer element in an embodiment of the invention.

FIG. 4 is a perspective view of a rosin ring 400 with a retainer element 401 attached to a cloth 402 for a user's finger, alternative to strap 103 of FIG. 2. In FIG. 4 the rosin cake is not seen as it is on the opposite side of cloth 402. Ring 401 has a base 403 to provide a flat surface for joining to cloth 402, and in various embodiments ring 401 may be of metal, wood, plastic, or other material, and is a continuous ring. In some cases, ring 401 provided as a part of an assembly of the ring, the cloth and the rosin cake may be provided in different sizes for different sized fingers of different users.

Figure 5:
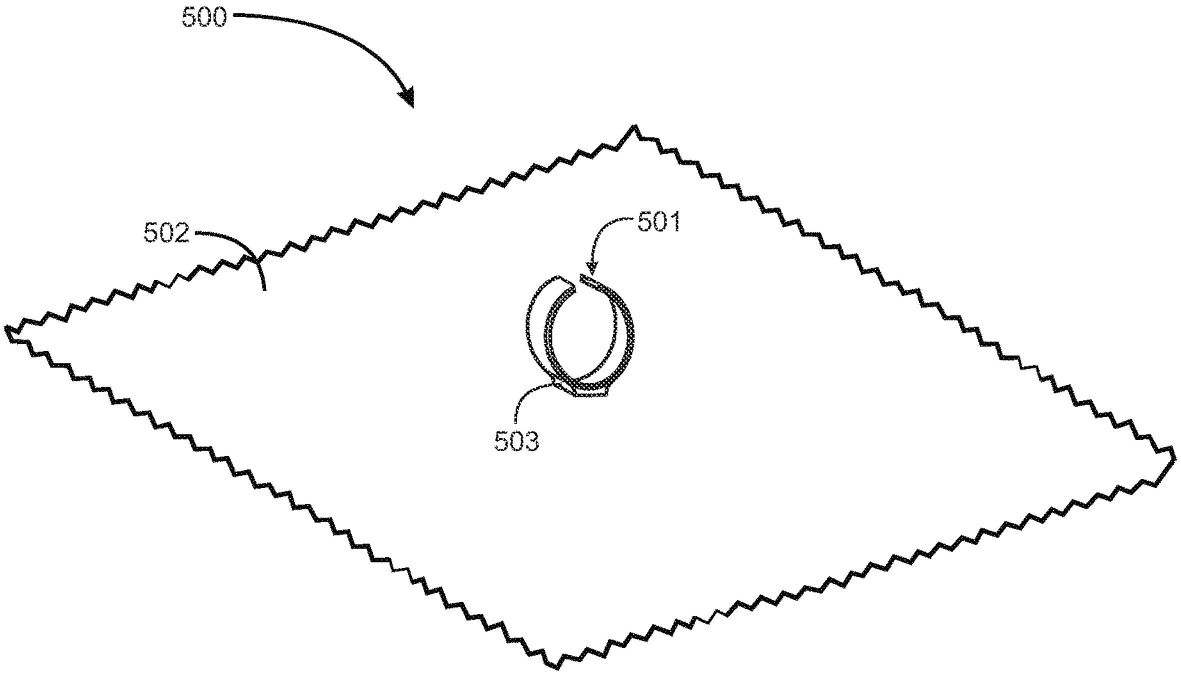
FIG. 5 is a perspective view of a Rosin Ring with another alternative retainer element in an embodiment of the invention.

FIG. 5 is a perspective view of a rosin ring 500 with a retainer element 501 attached to a cloth 502 for a user's finger alternative to strap 103 of FIG. 2 and ring 401 of FIG. 4. Retainer element 501 is in this example a split ring of thin and malleable metal or of flexible plastic enabling a user to open the ring to insert the finger, and, in the case of the malleable metal ring, to urge the ring closed around the finger, deforming the malleable metal. The plastic ring may be expected to close around the finger naturally, returning to the original size.

In different embodiments of the invention there may be some alterations. For example, rosin may be purchased in a cake form without a cloth associated with the rosin cake. In one alternative embodiment a rosin cake without a cloth may be secured to a retainer of any of the sorts described above. The retainer element in this case may be joined to the rosin cake by a strong adhesive, or in some embodiments the cake and retainer element may be mechanically joined, with or without a cloth between. There are many possibilities of mechanical retention such as conventional fasteners, prongs and the like.

Figure 6A:
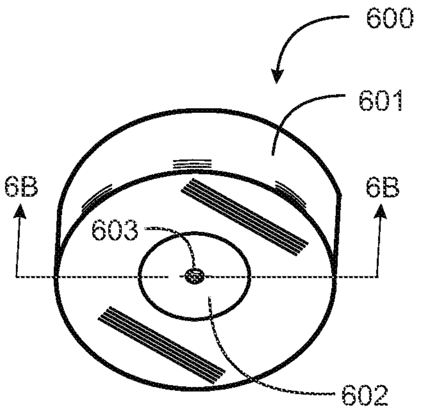
FIG. 6A is a perspective view of a rosin cake assembly in an embodiment of the invention.
Figure 6B:
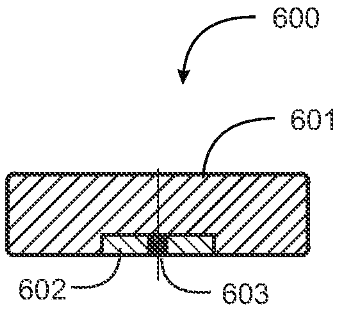
FIG. 6B is a section view of the rosin cake assembly of FIG. 6A.

FIG. 6A is a perspective view of a rosin cake assembly 600 that has a rosin cake 601 molded around a disk 602, smaller in diameter and thickness than the rosin cake. Disk 602, molded into the rosin cake, has a central, female threaded through hole 603 that may be utilized for fastening any one of various retainer elements to disk 602, rather than relying on adhesive. FIG. 6B is a section view of rosin cake assembly 600 taken along section line 6B-6B on FIG. 6A. The relative sizes of the actual cake, the disk and the threaded hole are evident in FIG. 6B. Disk 602 may be metal, such as an aluminum disk, or may be plastic or another material, such as wood. Hole 603 may be threaded to a standard ¼-20 thread, or another convention, appropriate thread size.

Figure 7A:
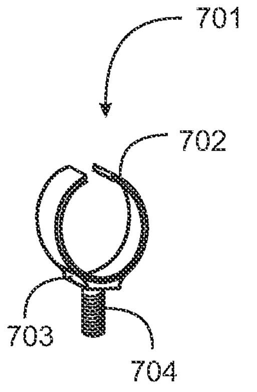
FIG. 7A is a perspective view of a retainer element with a threaded post in an embodiment of the invention.

FIG. 7A is a perspective view of a retainer element 701, which has an open ring 702 like retainer element 501 of FIG. 5, but with a threaded post 704 added to base 703. Post 704 is provided with a thread size compatible with whatever thread size may be used for hole 603 in disk 602.

Figure 7B:
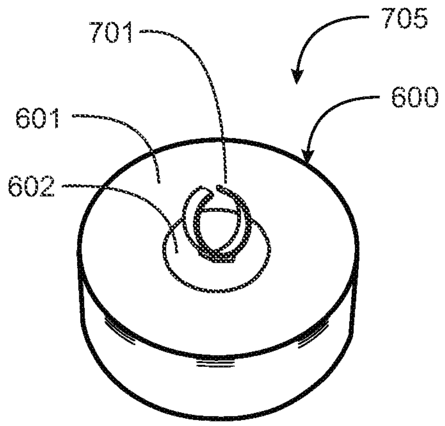
FIG. 7B illustrates an assembly of a retainer element with a threaded post to a rosin cake assembly.

FIG. 7B illustrates an assembly 705 having retainer element 701 threaded into disk 602 of cake assembly 600, such that a user my retain cake 601 of assembly 600 with a finger in retainer element 701. In this embodiment no cloth is used, but a user may have a cloth imposed between the retainer element and the cake assembly simply by cutting a small hole in the cloth and passing post 704 through the hole in the cloth when assembling the retainer element to the cake assembly.

It will be apparent to the skilled artisan that any one of the retainer elements described above may also be provided with a threaded post and may be joined to a cake assembly like assembly 600 by the threaded post, either with a cloth or without a cloth.

A person with ordinary skill in the art will understand that the embodiments illustrated and described are a few of many other embodiments that may have a retainer element capable of joining to a user's finger, or in some case to two or more fingers. The embodiments illustrated and described are entirely exemplary, and not limiting to the invention.

The invention claimed is:

1. An apparatus, comprising:

a rosin cake assembly comprising a cylindrical cake of bow rosin molded around a disk of rigid material having a lesser diameter and a lesser thickness than the cake of bow rosin, the disk of rigid material having one face coplanar with a face of the disk of bow rosin, the disk of rigid material further having a female threaded hole through the thickness of the disk; and a retainer element having a base with a threaded post extending from the base, the threaded post engaging the female threaded hole, securely joining the retainer element and the rosin cake assembly, the retainer element adapted to be gripped by a user's hand.

2. The apparatus of claim 1 further comprising a piece of cloth disposed between the base of the retainer element and the disk of rigid material.

3. The apparatus of claim 1 wherein the retainer element comprises a ring having an inside diameter large enough for a finger of the user's hand, the rosin cake assembly joined to the ring securely by the threaded post engaging the female threaded hole.

4. The apparatus of claim 1 wherein the retainer element is a strip of flexible material having a length sufficient to encircle a finger of the user's hand, and compatible areas of hook and loop fastener material on opposite ends of the strip.

5. The apparatus of claim 1 wherein the retainer element is a split ring of thin and malleable metal enabling a user to open the ring to insert the finger, and to urge the ring closed around the finger, deforming the malleable metal.

6. The apparatus of claim 1 wherein the retainer element is a split ring of flexible plastic enabling a user to open the ring from a default size to insert the finger, the ring returning to the default size after insertion.

7. A method for applying rosin to strings of a bow, comprising:

engaging, with a finger of one hand, a retainer element of an apparatus having a cake of bow rosin with the retainer element joined securely to the cake of bow rosin by threading a threaded post of the retainer element into a rigid disk molded into the cake of bow rosin;

holding the bow with an opposite hand; and rubbing the cake of bow rosin with the one hand along the length of strings of the bow.

8. The method of claim 7 further comprising placing a piece of cloth between the retainer element and the cake of bow rosin.

9. The method of claim 7 wherein the retainer element is a ring having an inside diameter large enough for a finger of the user's hand, the cake of bow rosin joined to the ring securely at one point outside the inside diameter of the ring, comprising engaging the retainer element by passing the finger through the ring.

10. The method of claim 7 wherein the retainer element is a strip of flexible material having a length sufficient to encircle a finger of the user's hand, and compatible areas of hook and loop fastener material on opposite ends of the strip, the cake of bow rosin joined to the strip at a point proximate a mid-point of the strip, comprising engaging the retainer element by wrapping the strip around the finger and engaging the areas of hook and loop fastener material.

11. The method of claim 7 wherein the retainer element is a split ring of thin and malleable metal, comprising opening the ring, inserting the finger, and urging the ring closed around the finger, deforming the malleable metal.

12. The method of claim 7 wherein the retainer element is a split ring of flexible plastic, comprising opening the ring from a default size, and inserting the finger, the ring returning to the default size after insertion.

* * * * *